(12) United States Patent
Wu (10) Patent No.: US 8,184,211 B2
(45) Date of Patent: May 22, 2012

(54) QUASI ANALOG KNOB CONTROL METHOD AND APPARTUS USING THE SAME

(75) Inventor: Meng Tsung Wu, Hsin-Chu (TW)

(73) Assignee: Pixart Imaging Inc., Hsin-Chu (TW)

( * ) Notice: Subject to any disclaimer, the term of this patent is extended or adjusted under 35 U.S.C. 154(b) by 1157 days.

(21) Appl. No.: 12/017,826

(22) Filed: Jan. 22, 2008

(65) Prior Publication Data

US 2008/0174702 A1 Jul. 24, 2008

(30) Foreign Application Priority Data

Jan. 23, 2007 (TW) ................................. 96102447 A (51) Int. Cl.
*H04N 5/44* (2006.01)
(52) U.S. Cl. .......................... 348/734; 345/158; 715/857
(58) Field of Classification Search .......................... None
See application file for complete search history.

(56) References Cited

U.S. PATENT DOCUMENTS

| | | | | | |
|---|---|---|---|---|---|
| 5,574,479 | A | * | 11/1996 | Odell | 345/158 |
| 6,426,820 | B1 | * | 7/2002 | Verzulli | 398/106 |
| 7,102,616 | B1 | * | 9/2006 | Sleator | 345/158 |
| 7,720,552 | B1 | * | 5/2010 | Lloyd | 700/10 |
| 2005/0243062 | A1 | * | 11/2005 | Liberty | 345/158 |
| 2006/0239121 | A1 | * | 10/2006 | Kong et al. | 367/128 |
| 2007/0052177 | A1 | * | 3/2007 | Ikeda et al. | 273/317 |
| 2007/0213127 | A1 | * | 9/2007 | Sato | 463/36 |
| 2007/0233424 | A1 | * | 10/2007 | Ohta | 702/154 |
| 2008/0158436 | A1 | * | 7/2008 | Chao et al. | 348/734 |
| 2008/0174550 | A1 | * | 7/2008 | Laurila et al. | 345/158 |
| 2008/0242385 | A1 | * | 10/2008 | Miyamoto | 463/1 |
| 2009/0072992 | A1 | * | 3/2009 | Yun | 340/825.22 |
| 2010/0053102 | A1 | * | 3/2010 | Gelling et al. | 345/173 |
| 2010/0053467 | A1 | * | 3/2010 | Maxson | 348/734 |

* cited by examiner

Primary Examiner — Dominic D Saltarelli
Assistant Examiner — Jason J Chung (57) ABSTRACT

A quasi analog knob control method for controlling a function status of a display device by imitating the rotation of an analog knob includes providing at least two reference points for generating light of a predetermined spectrum and defining a predetermined area; providing an image sensor to point inside the predetermined area; receiving the light of the predetermined spectrum by the image sensor to form a digital image; identifying image positions of the reference points on the digital image and obtaining a first parameter; rotating the image sensor for imitating the rotation of the analog knob and obtaining a second parameter; and calculating a rotation angle difference between the first and the second parameters to control the function status of the display device accordingly.

41 Claims, 9 Drawing Sheets

QUASI ANALOG KNOB CONTROL METHOD AND APPARTUS USING THE SAME

CROSS REFERENCE TO RELATED APPLICATION

This application claims the priority benefit of Taiwan Patent Application Serial Number 096102447, filed on Jan. 23, 2007, the full disclosure of which is incorporated herein by reference.

BACKGROUND OF THE INVENTION

1. Field of the Invention

This invention generally relates to a display device control method, and more particularly, to a quasi analog knob control method for a display device wherein a function status of the display device is controlled by rotating a remote controller to imitate the rotation of an analog knob.

2. Description of the Related Art

Most of the conventional remote controllers which need to be used in cooperation with a TV screen or a projection screen to control, for example, televisions, audios or DVD players implement the control by means of infrared carrier signal. All function buttons on the remote controllers are switched ON and OFF digitally, and thus normally it is necessary to repeatedly push the ON (UP) or OFF (DOWN) button to continuously alter a function status. For example, when it is desired to continuously increase or decrease the volume status of a television, volume function buttons have to be repeatedly pushed so as to be able to continuously alter the volume.

For example, a remote control device disclosed in Taiwan Patent No. 522375 provides a remote controller which allows various operations and prevents complicated operations. The remote controller can remotely control an audio visual device and includes an analog switch formed of an operating element and a pressure-sensitive resistor. The analog switch outputs a signal with various levels depending upon a pressing force applied to the operating element. By employing the analog switch in a control button of the remote control device, it becomes possible to output a signal having various levels depending upon a pressing force applied to the control button. This allows a signal control button to be used for a plurality of functions so as to reduce the number of buttons and simplify the operating procedure. However in practical operation, it is still inconvenient to operate by repeatedly press a button in order to alter a function status. Furthermore, if a button is pressed frequently, its using lifetime will be shortened.

According to the above reasons, it is necessary to further improve the conventional remote control device so as to increase the operational convenience thereof.

SUMMARY OF THE INVENTION

It is an object of the present invention to provide a quasi analog knob control method and an apparatus using the same, wherein a user can utilize an image sensor to sense the light of a predetermined spectrum from two reference points to accordingly control a function status of a display device and the user can imitate the rotation of a analog knob to control the function status only by rotating the image sensor so as to humanize the operation of the display device.

It is another object of the present invention to provide a quasi analog knob control method and an apparatus using the same, wherein an image sensor is integrated in a remote controller and a user can control the function status of a display device only by rotating the remote controller, such that it is not necessary to dispose many buttons on the remote controller to reduce the number of buttons.

It is a further object of the present invention to provide a quasi analog knob control method and an apparatus using the same, wherein an image sensor is integrated in a remote controller and a user can control the function status of a display device only by rotating the remote controller thereby simplifying operational procedures of the display device.

It is a further object of the present invention to provide a quasi analog knob control method and an apparatus using the same, wherein the function status of a display device can be controlled by operating at least two reference points which can generate the light of a predetermined spectrum in coordination with an image sensor integrated with an optical filter, and the image recognition can be simplified since the image sensor senses the light only from the reference points.

In order to achieve the above objects, the present invention provides a quasi analog knob control method which can control a function status of a display device by imitating the rotation of an analog knob. The control method includes the steps of: providing at least two reference points for generating light of a predetermined spectrum and defining a predetermined area surrounding the reference points; providing an image sensor to point inside the predetermined area; receiving the light of the predetermined spectrum by the image sensor to form a digital image; identifying image positions of the reference points on the digital image and obtaining a first parameter; rotating the image sensor for imitating the rotation of the analog knob and obtaining a second parameter; and calculating a rotation angle difference between the first and the second parameters so as to control the function status of the display device accordingly.

According to another aspect of the present invention, the present invention further provides a quasi analog knob control apparatus which can control a function status of a display device by imitating the rotation of an analog knob. The quasi analog knob control apparatus includes at least two reference points, an image sensor and a processing unit. The reference points generate light of a predetermined spectrum and define a predetermined area surrounding the reference points. The image sensor is for pointing inside the predetermined area and receiving the light of the predetermined spectrum to form a digital image. The processing unit receives the digital image and identifies image positions of the reference points on the digital image, wherein the rotation of the analog knob is imitated by rotating the image sensor during capturing images and a rotation angle of the image sensor is calculated according to the image positions of the reference points on the digital image identified by the processing unit thereby controlling the function status of the display device accordingly.

According to an alternative aspect of the present invention, the present invention further provides a screen remote control apparatus including a screen, at least two reference points and a remote controller. A function status of the screen can be controlled by imitating the rotation of an analog knob. The reference points generate light of a predetermined spectrum and define a predetermined area surrounding the reference points. The remote controller includes an image sensor for pointing inside the predetermined area and receiving the light of the predetermined spectrum to form a digital image, and a processing unit for receiving the digital image and identifying image positions of the reference points on the digital image, wherein the rotation of the analog knob is imitated by rotating the remote controller and a rotation angle of the remote controller is calculated according to the image positions of the reference points on the digital image thereby controlling the function status of the screen accordingly.

The quasi analog knob control method of the present invention can be adapted to control function statuses of any display devices, e.g. the function statuses of a computer screen, a game machine screen or a television, wherein embodiments of the function statuses include a volume status, a brightness status, a contrast status, a screen position status, a screen size status and any function status which is used for setting or altering the displaying or operating status of the display device.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE PREFERRED EMBODIMENT

First of all, it should be noted that, wherever possible, the same reference numerals will be used throughout the drawings to refer to the same or like parts.

Figure 1A:
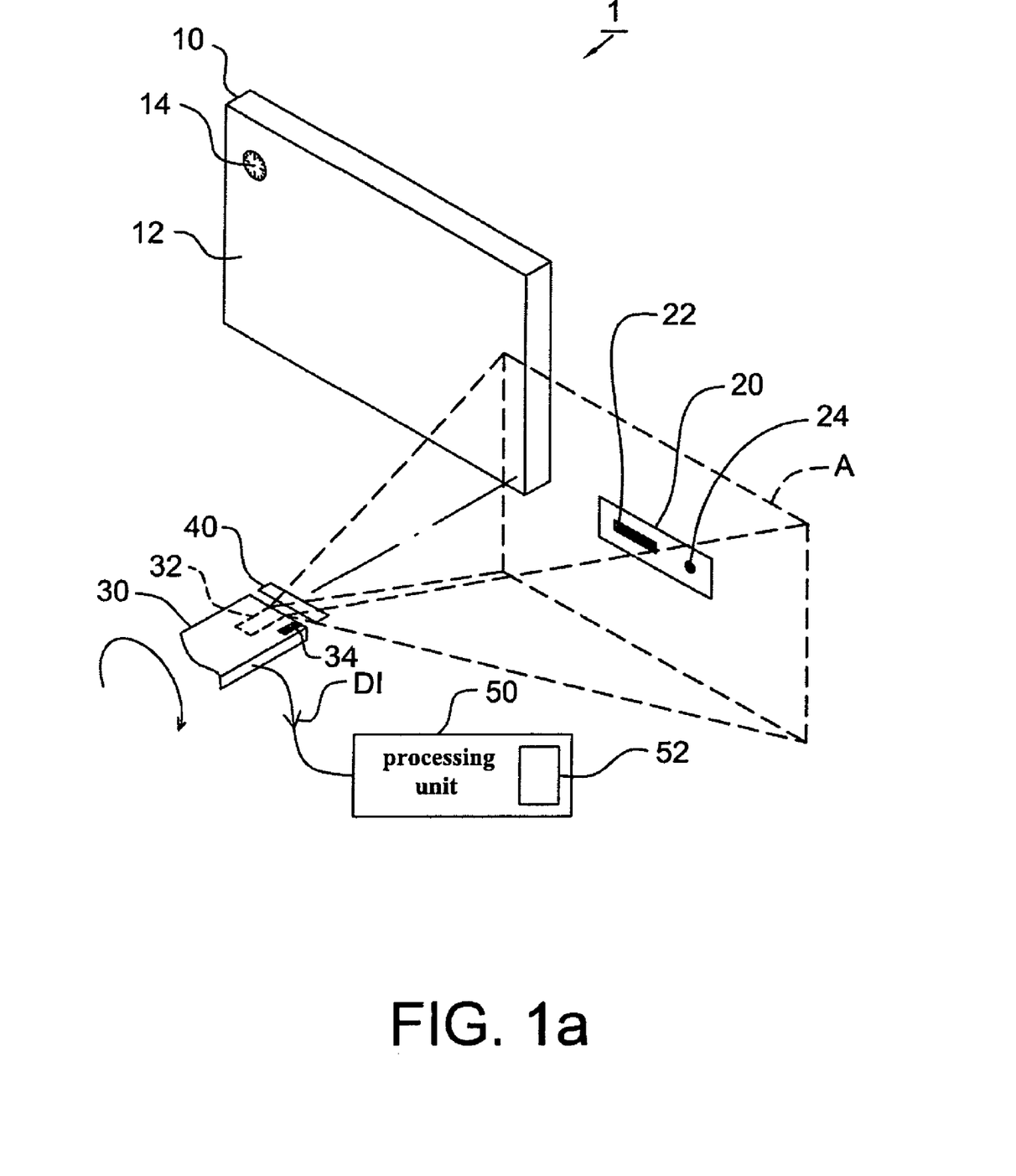
FIG. 1a shows a schematic view of a quasi analog knob control apparatus according to the first embodiment of the present invention.

Referring to FIG. 1a, it shows the quasi analog knob control apparatus 1 according to the first embodiment of the present invention. The control apparatus 1 includes a display device 10, at least two reference points 22 and 24, a remote controller 30, an image sensor 32, an optical filter 40 and a processing unit 50. The quasi analog knob referred in the present invention means that the remote controller 30 is rotated by a user to imitate the rotation of a analog knob so as to control function statuses of the display device 10, e.g. a volume status, a brightness status, a contrast status, a screen position status, a screen size status and any operating status of the display device 10. Embodiments of the display device 10 include a computer screen, a television, a computer machine screen and any device used for showing images, and the display device 10 includes a display screen 12 for showing images. A knob icon 14 may be shown on the display screen 12 of the display device 10 and acts corresponding to the actions of the quasi analog knob of the present invention. In this manner, a user (not shown) can recognize the current control status from the knob icon 14 so as to humanize the operation of the display device 10. Since the function statuses of the display device 10 can be controlled only by rotating the remote controller 30, the button numbers on the remote controller 30 can be decreased. According to the type of the display device 10, the remote controller 30 may be a remote controller of, for example, a computer screen, a television or a game machine etc. In should be understood that the knob icon 14 may be either implemented or not according to practical products.

The reference points 22 and 24 generate light of a predetermined spectrum, e.g. infrared light with wavelength between 0.84 μm and 0.94 μm. The reference points 22 and 24 may be emitting light sources, e.g. infrared light emitting diodes; they also may be non-emitting light sources which can reflect the light of the predetermined spectrum, e.g. infrared mirrors, and if this is the case, preferably the quasi analog knob control apparatus 1 further includes a light source 34 for providing the light of the predetermined spectrum to be reflected by the reference points 22 and 24, and the additional light source 34, for example, can be integrated on the front side of the remote controller 30. In this embodiment, the reference points 22 and 24 are shown as an independent reference device 20 such that the reference device 20 can be placed at any places that a user desires during operation so as to increase the operational convenience. In this manner, the user needs not to point the remote controller 30 to the display device 10 during operation; he only needs to place the reference device 20 at a visible location and points the remote controller 30 thereto, and then it is possible to control the function status of the display device 10. In addition, the reference points 22 and 24 preferably have different shapes, e.g. one is strip shape and the other is dot shape (the strip shape can be formed by a plurality of light emitting diodes arranged in order), or different areas; they also may have identical shapes.

In another embodiment, the control apparatus 1 can include four reference points, e.g. three of which are dot shapes and the rest is strip shape. In this embodiment, the illustration is based on the case having two reference points, wherein the reference point 22 is strip shape and the reference point 24 is dot shape. Embodiments implemented by other shapes are similar to the case shown in this embodiment and therefore their details will not de described herein.

The image sensor 32 can be integrated in the remote controller 30 and it can sense the light of a predetermined spectrum, e.g. an IR image sensor with the sensible wavelengths between 0.84 μm and 0.94 μm. The image sensor 32 is for sensing the light of the predetermined spectrum coming from the reference points 22 and 24, and because it can filter the light with the band outside the predetermined spectrum, e.g. light coming from the display screen 12, the complexity of the image recognition can be significantly decreased. In addition, an optical filter 40, e.g. an IR filter, of the predetermined spectrum (wavelengths between 0.84 μm and 0.94 μm), which can be integrated in the remote controller 30, can be disposed in front of the image sensor 32 such that the image sensor 32 can be implemented by normal image sensor, e.g. CMOS image sensor or a CCD image sensor with high frame rate such as 200 frames/sec and wide-viewing angle. In this manner, the image sensor 32 can sense the light only from the reference points 22 and 24. After the image sensor 32 senses the light from the reference points 22 and 24, a digital image DI will be formed and sent to the processing unit 50 for storing and processing.

After receiving the digital image DI coming from the remote controller 30, the processing unit 50 will accordingly calculate the positions and rotation angles of the images of the reference points 2 and 24 on the digital image DI. The processing unit 50 can further include a wireless communication unit 52 for communicating with the display device 10 wirelessly so as to accordingly control the knob icon 14 shown on the display device 10 and the function statuses of the display device 10 according to the rotation angle of the images of the reference points 22 and 24 on the digital image DI calculated by the processing unit 50, and the details will be described in the following paragraphs.

Figure 1B:
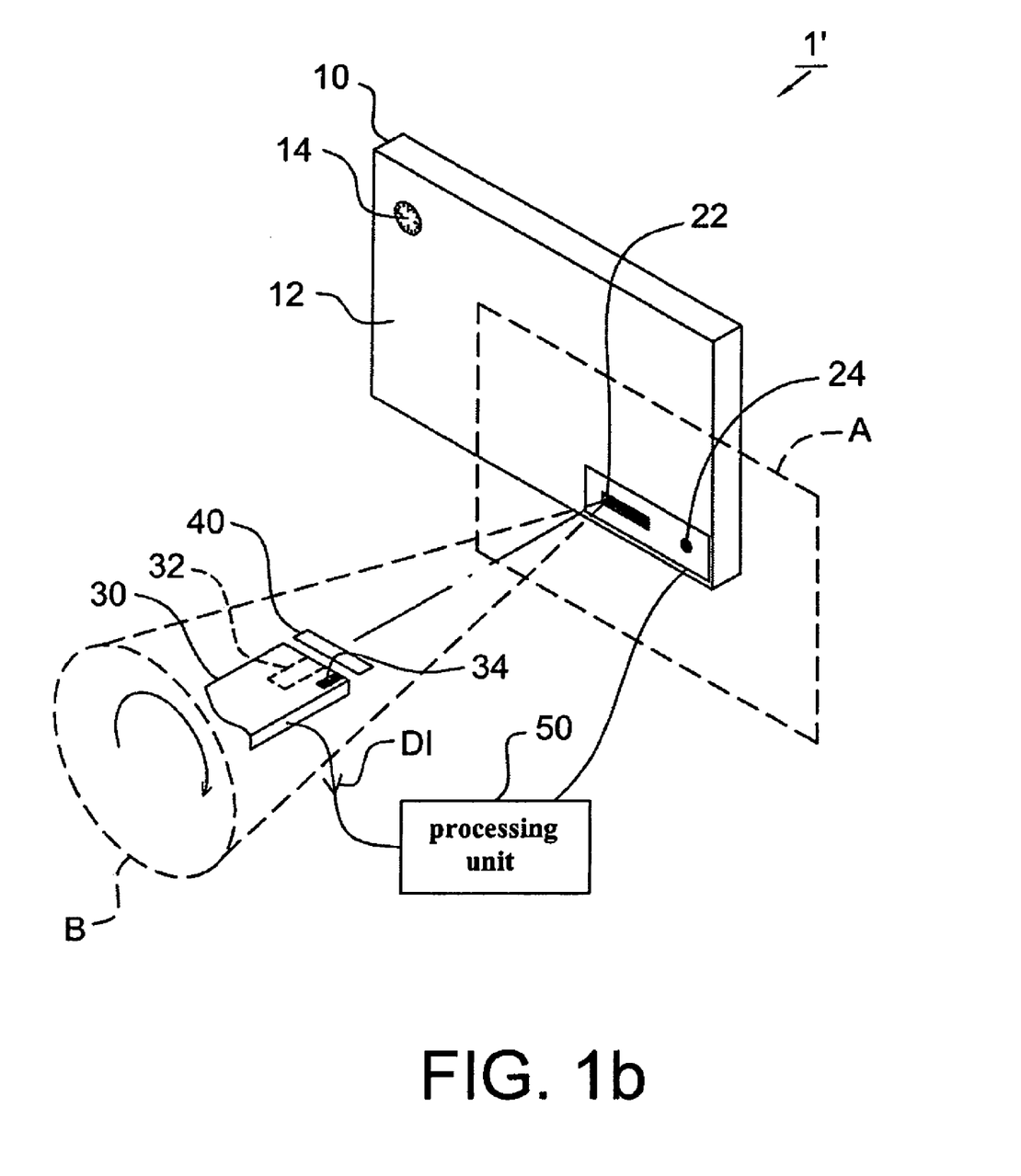
FIG. 1b shows a schematic view of a quasi analog knob control apparatus according to the second embodiment of the present invention.
Figure 2A:
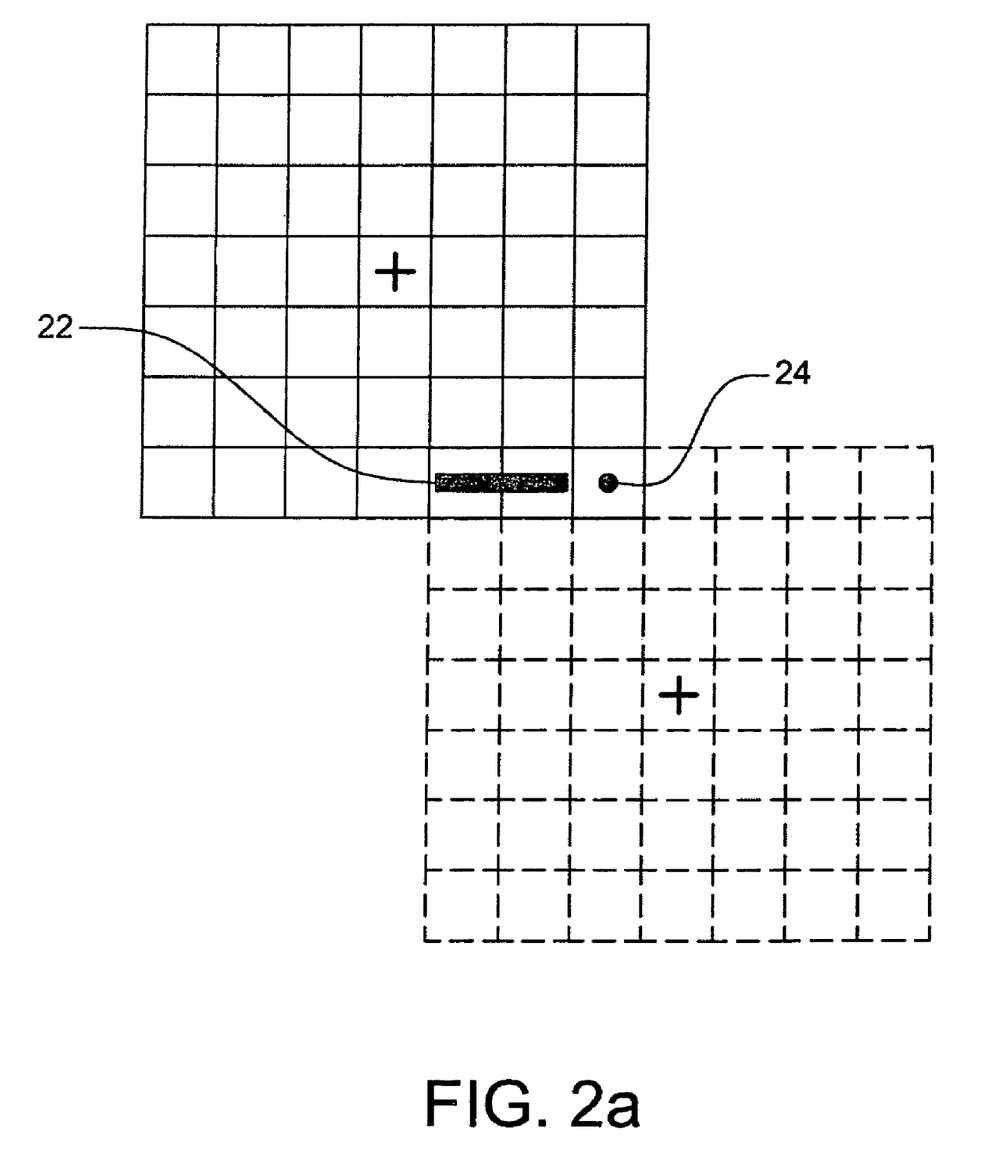
FIG. 2a shows a schematic view of a sensible area of the image sensor according to the embodiments of the present invention, wherein the reference points are respectively shown at the right-bottom and left-top corners in the viewing angle of the image sensor.
Figure 2B:
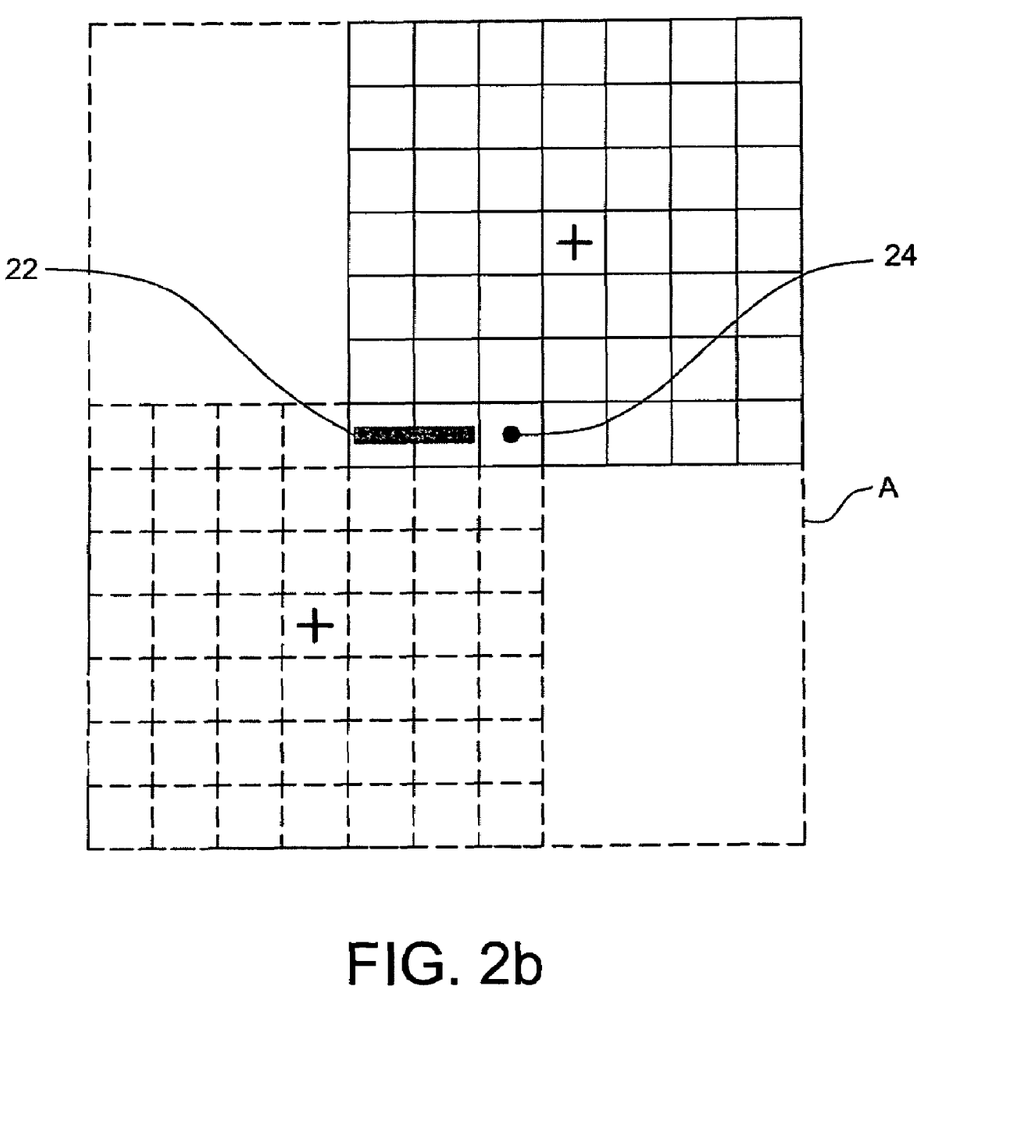
FIG. 2b shows a schematic view of a sensible area of the image sensor according to the embodiments of the present invention, wherein the reference points are respectively shown at the left-bottom and right-top corners in the viewing angle of the image sensor.

Pleasing referring to FIG. 1b, it shows a quasi analog knob control apparatus 1' according to the second embodiment of the present invention, and it also includes the display device 10, at least two reference points 22 and 24, the remote controller 30, the image sensor 32, the optical filter 40 and the processing unit 50. The processing unit 50 calculates the rotation angle of the images of the reference points 22 and 24 sensed by the image sensor 32, and then the remote controller 30 accordingly controls the motion of a knob icon 14 on the display screen 12 of the display device 10 and the function status of the display device 10.

The differences between this embodiment and the first embodiment are that the reference points 22 and 24 are integrated in the display device 10, and preferably they are disposed at the front panel of the display device 10, such that the reference points 22 and 24 can form an emitting area "B" in front of the display device 10 according to their emitting angle and the light emitted from the reference points 22 and 24 can be received by the image sensor 32 located inside the emitting area "B". The processing unit 50 is electrically connected to the display device 10 for signal transmission and then the remote controller 30 can control the motion of the knob icon 14 shown on the display screen 12 of the display device 10 according to the positions and rotation angles of the images of the reference points 22 and 24 on the digital image calculated by the processing unit 50. In addition, it can be understood that, in different embodiments, the processing unit 50 can be integrated in the remote controller 30 or in the display device 10, and the remote controller 30 can be electrically connected to the display device 10 for signal transmission. In addition, it also can be understood that the viewing angle of the image sensor 32 shown in FIG. 1a also exists in FIG. 1b; the emitting angle (emitting area) of the reference point 22 shown in FIG. 1b also exists in FIG. 1a and the reference point 24 also has an emitting angle. They are not shown simultaneously in the same figure only for simplification.

Please referring to FIGS. 1a, 1b, 2a and 2b, FIGS. 2a and 2b show a sensible area in which the image sensor 32 can sense the reference points 22 and 24 in the embodiments of the present invention, wherein the sensible area is determined by the viewing angle of the image sensor 32 and the emitting angles of the reference points 22 and 24 together. For simplification, the sensible area of the image sensor 32 is illustrated by a 7×7 sensing array, and the actual size of the sensing array is determined by actual products. When the image sensor 32 is located inside the emitting area "B", according to the viewing angle of the image sensor 32, a sensible area "A" of the light from the reference points 22 and 24 can be defined surrounding the reference points 22 and 24 (containing the reference points 22 and 24), as shown in FIGS. 1a and 1b. Because it is more convenient to a user to have a larger sensible area "A", preferably the image sensor 32 has a wide-viewing angle lens. In the present invention, FIG. 2a can be obtained when the image sensor 32 captures images respectively having the images of the reference points 22 and 24 at the right-bottom corner (shown with continuous line) and left-top corner (shown with dotted line). Although there is shown a sign "+" to represent the center of the sensing array of the image sensor 32, it may be omitted in actual operation. Similarly, FIG. 2b can be obtained when the image sensor 32 captures images respectively having the images of the reference points 22 and 24 at the left-bottom corner (shown with continuous line) and right-top corner (shown with dotted line). In this manner, the sensible area "A" can be defined.

Figure 3:
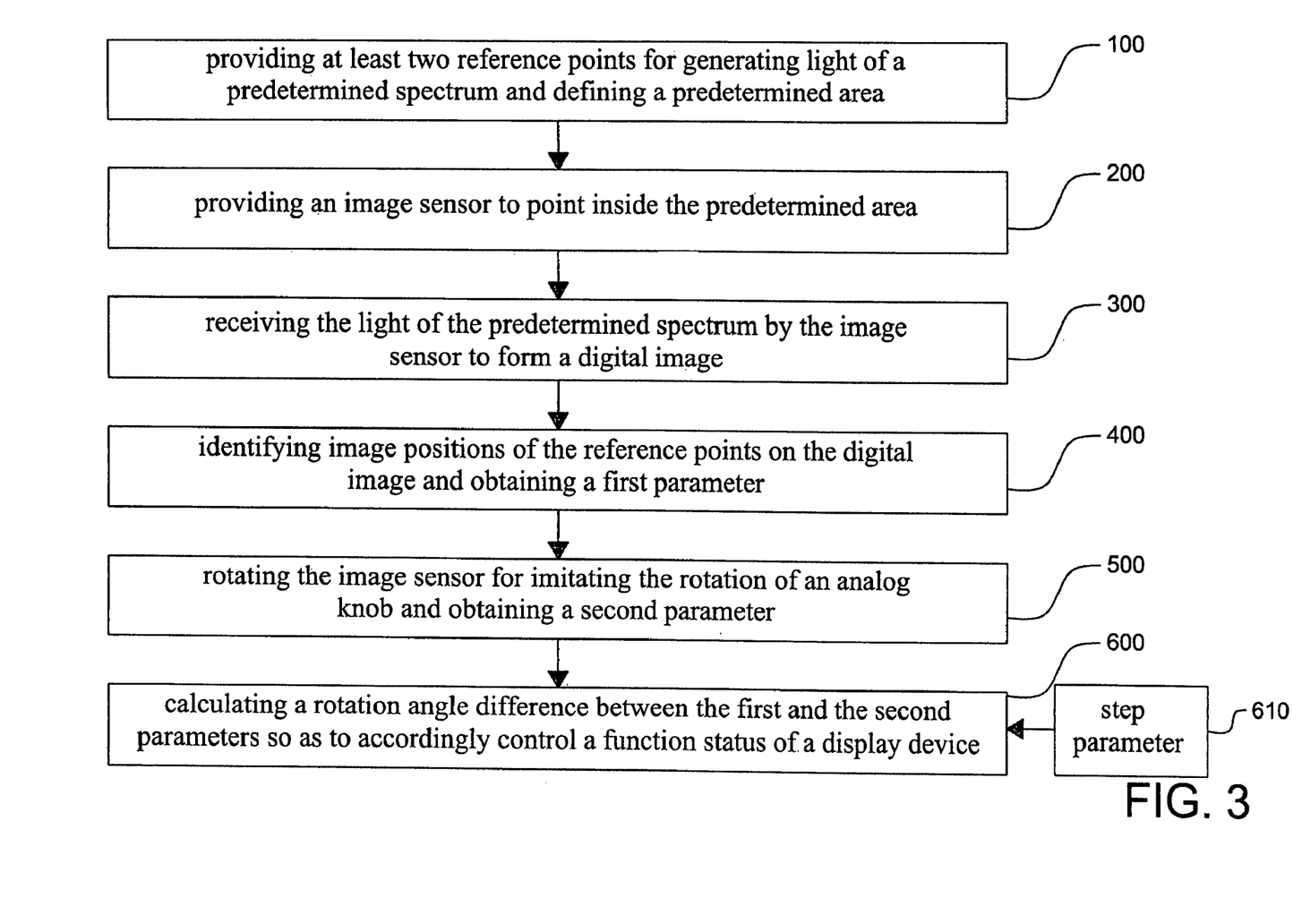
FIG. 3 shows a flow chart of the quasi analog knob control method according to the embodiments of the present invention.

Referring to FIG. 3, it shows a flow char of the quasi analog knob control method according to the embodiments of the present invention, which can be adapted to the quasi analog knob control apparatus 1 and 1'. The control method includes the steps of: providing at least two reference points for generating light of a predetermined spectrum and defining a predetermined area surrounding the reference points (step 100); providing an image sensor to point inside the predetermined area (step 200); receiving the light of the predetermined spectrum by the image sensor to form a digital image (step 300); identifying image positions of the reference points on the digital image and obtaining a first parameter (step 400); rotating the image sensor for imitating the rotation of a analog knob and obtaining a second parameter (step 500); and calculating a rotation angle difference between the first and the second parameters so as to control the function status of a display device accordingly (step 600).

Figure 4A:
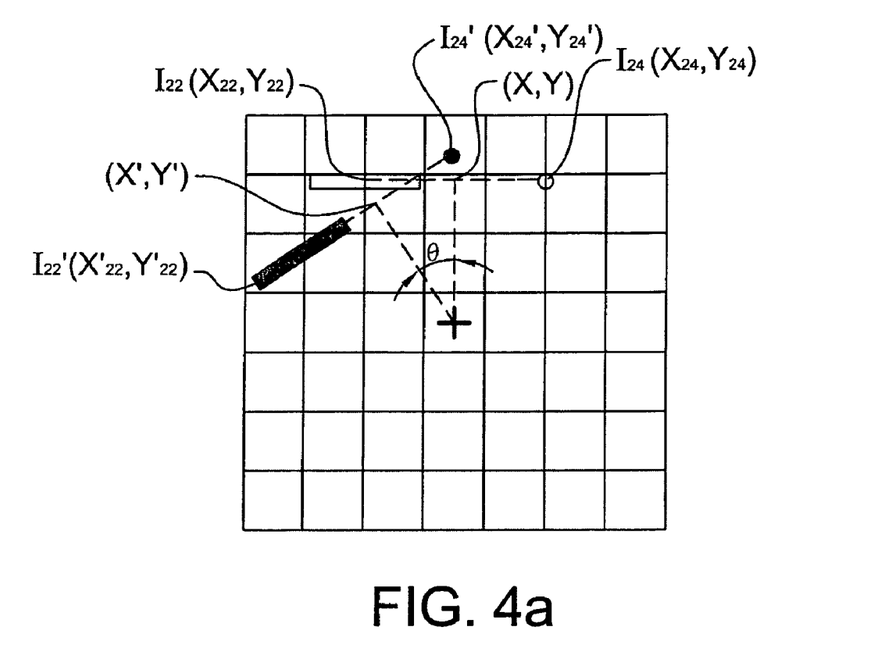
FIG. 4a shows a schematic view of an image sensed by the image sensor according to the embodiments of the present invention, which shows a method for calculating a rotation angle difference between the images of the reference points.

Please referring to FIGS. 1a, 3 and 4a, the quasi analog knob control method of the present invention will be illustrated based on the quasi analog knob control apparatus 1 according to the first embodiment of the present invention, and since the control method adapted to the second embodiment of the present invention is similar to that adapted to the first embodiment, the details will not be described herein. First, the reference points 22 and 24 generates light of a predetermined spectrum, e.g. infrared light with the wavelength between 0.84 μm and 0.94 μm, and a sensible area "A" surrounding the reference points 22 and 24 which is determined by the emitting angles of the reference points 22, 24 and the viewing angle of the image sensor 32 together can be defined (step 100). Point the image sensor 32 inside the sensible area "A" (step 200), and digital images $I_{22}$, $I_{24}$ of the reference points 22, 24 can be obtained on the sensing array of the image sensor 32 (step 300) and stored in the processing unit 50, as shown in FIG. 4*a*. Next, the processing unit 50 calculates image positions of the reference points 22 and 24 so as to obtain a first parameter (step 400) which is also stored in the processing unit 50. The first parameter includes coordinates of the images of the reference points $I_{22}$, $I_{24}$ and their average coordinate on a plane space formed by the sensing array of the image sensor 32, e.g. a plane space having the center of the sensing array "+" as original point. For example, in FIG. 4*a*, the coordinates of the images of the reference points $I_{22}$, $I_{24}$ are respectively shown as $(X_{22}, Y_{22})$ and $(X_{24}, Y_{24})$, and their average coordinate is shown as $(X, Y)$.

Then, a user (not shown) can rotate the remote controller 30, and since the image sensor 32 in this embodiment is integrated in the remote controller 30, the image sensor 32 is rotated simultaneously. For example, in this embodiment, the remote controller 30 is rotated clockwise, and thus the images of the reference points $I_{22}$, $I_{24}$ are rotated by θ degrees counterclockwise (FIG. 4*a*); therefore, the images $I_{22}$, $I_{24}$ are rotated to form the images $I_{22}'$, $I_{24}'$ (step 500) with coordinates $(X_{22}', Y_{22}')$ and $(X_{24}', Y_{24}')$ respectively, and average coordinate $(X', Y')$, and all the coordinates are stored in the processing unit 50. In the present invention, the rotation angle of the remote controller 30 (the image sensor 32) can be calculated by two ways. First of which is to calculate an included angle between a connection line of the average coordinate $(X, Y)$ and the center "+" of the sensing array of the image sensor 32 before rotation and a connection line of the average coordinate $(X', Y')$ and the center "+" of the sensing array of the image sensor 32 after rotation, and the included angle is shown as an angle θ as in FIG. 4*a*.

Figure 4B:
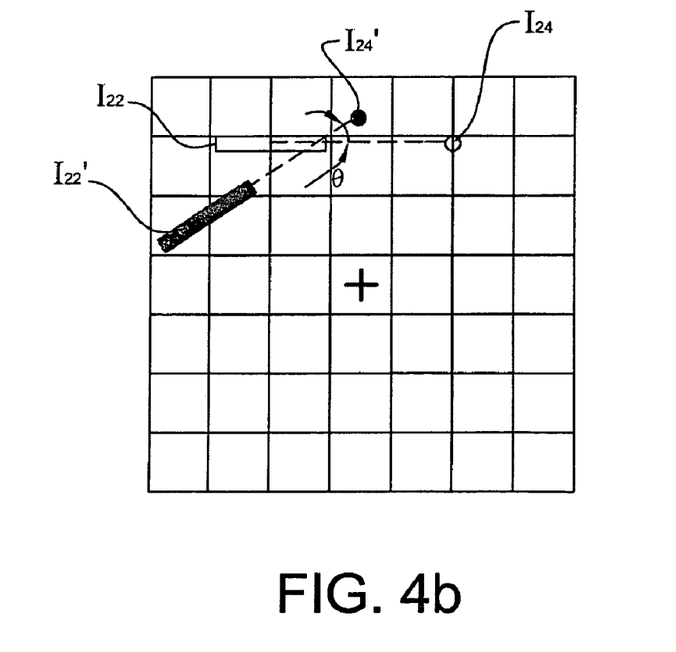
FIG. 4b shows a schematic view of an image sensed by the image sensor according to the embodiments of the present invention, which shows another method for calculating a rotation angle difference between the images of the reference points.

Referring to FIG. 4*b*, it shows another method to calculate the rotation angle of the remoter controller 30 according to the embodiments of the present invention. As shown, $I_{22}$ and $I_{24}$ represent the images of the reference points 22 and 24 on the sensing array before the remote controller 30 is rotated; the $I_{22}'$ and $I_{24}'$ represent the images of the reference points 22 and 24 on the sensing array after the remote controller 30 is rotated, wherein the rotation angle is obtained by calculating an included angle θ between a connection line of the images $I_{22}$, $I_{24}$ and a connection line of the images $I_{22}'$, $I_{24}'$. The processing unit 50 controls the knob icon 14 shown on the display device 10 to act correspondingly according to the calculated rotation angle. For instance, when a user rotates the remote controller 30 by thirty degrees clockwise, the knob icon 14 is rotated simultaneously in clockwise direction for representing a function status becoming larger or smaller; on the contrary, when the user rotates the remote controller 30 by thirty degrees counterclockwise, the knob icon 14 is rotated simultaneously in counterclockwise direction for representing a function status becoming smaller or larger.

Please referring to FIG. 3 again, in order to control the varying sensitivities of the knob icon 14 and the function status, during the calculation of the rotation angle (step 600), a step parameter can be inputted to the processing unit 50 (step 610), e.g. the step parameter of the present invention is set as two degrees. Meaning that, the quasi analog knob control method of the present invention can identify at least two degrees of the rotation angle, and the identifiable angle is between 358 degrees clockwise and counterclockwise, and thus the control method includes 179 steps. In other embodiments, the identifiable angle can be altered by changing the step parameter. It can be defined as when the step parameter is large, the knob icon 14 and the function status have low sensitivities, i.e. it is necessary to rotate the remote controller 30 by a relatively larger angle so as to be able to alter the function status and the knob icon 14. It also can be defined as when the step parameter is small, the knob icon 14 and the function status have low sensitivities, and the definitions are determined according to different products.

Figure 5A:
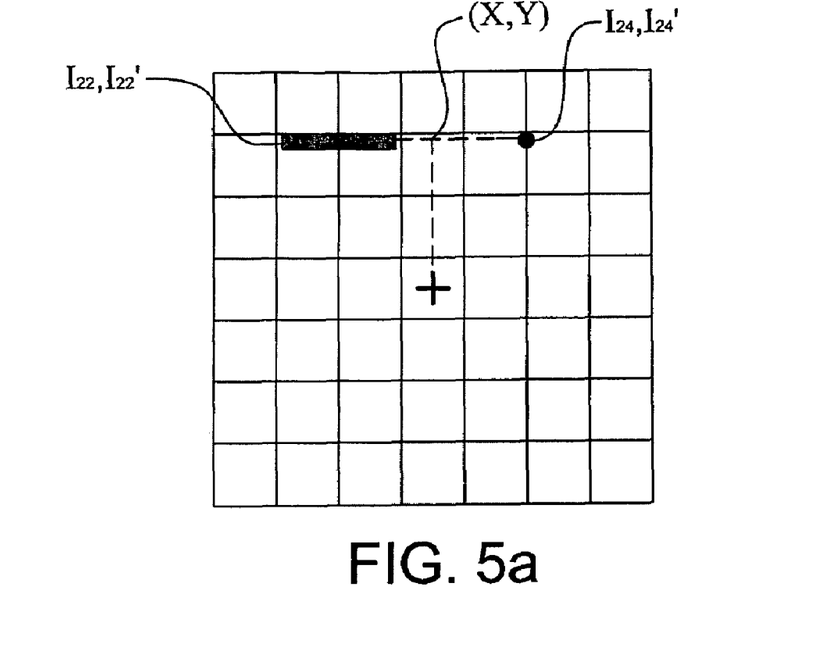
FIG. 5a shows a schematic view of an image sensed by the image sensor according to the embodiment of the present invention, wherein the image sensor captures the image under 0 degree clockwise rotation.
Figure 5B:
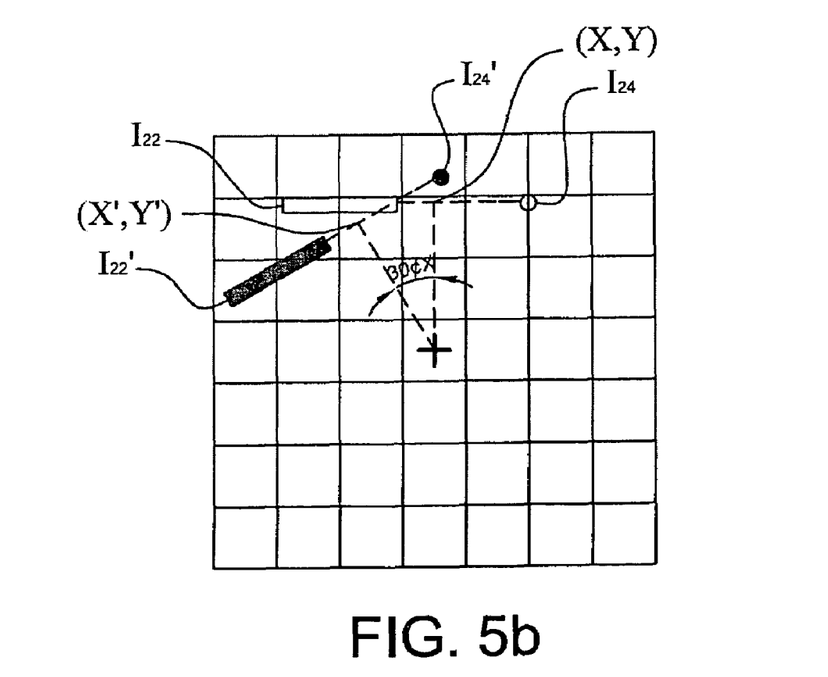
FIG. 5b shows a schematic view of an image sensed by the image sensor according to the embodiment of the present invention, wherein the image sensor captures the image under 30 degrees clockwise rotation.
Figure 5C:
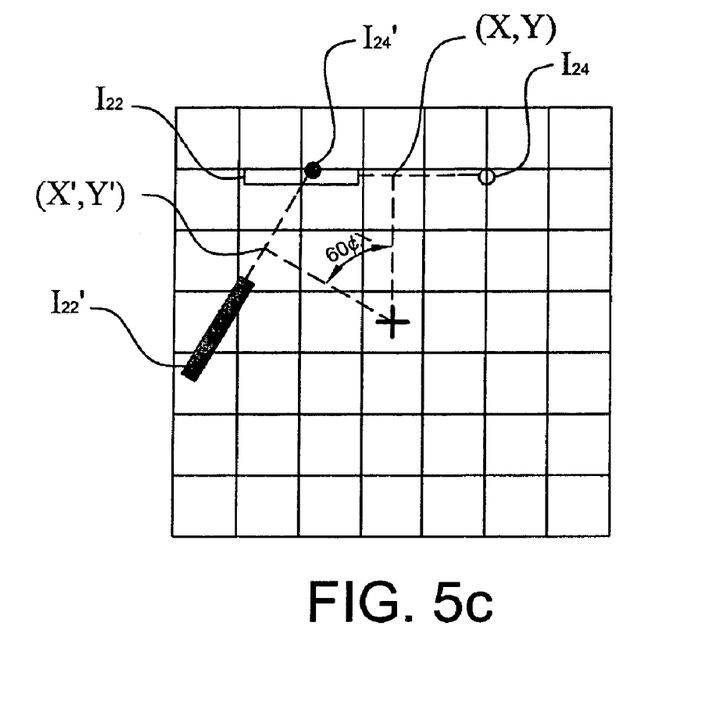
FIG. 5c shows a schematic view of an image sensed by the image sensor according to the embodiment of the present invention, wherein the image sensor captures the image under 60 degrees clockwise rotation.
Figure 5D:
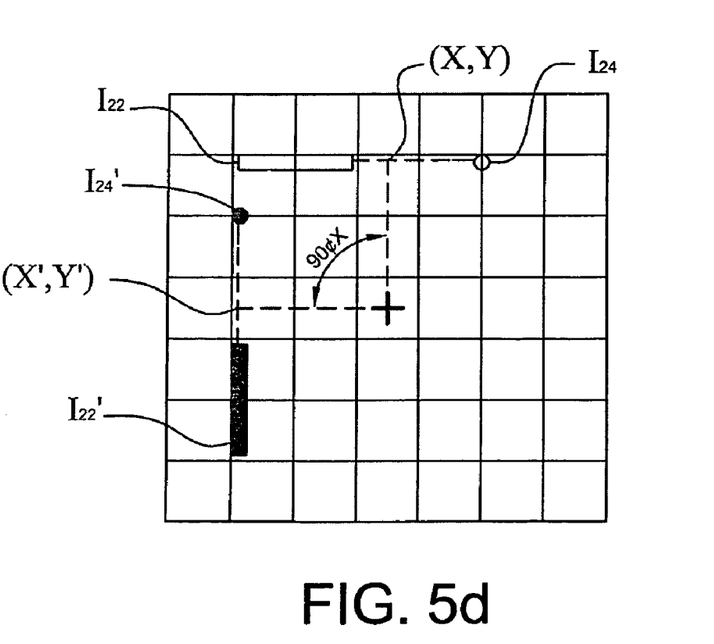
FIG. 5d shows a schematic view of an image sensed by the image sensor according to the embodiment of the present invention, wherein the image sensor captures the image under 90 degrees clockwise rotation.
Figure 5E:
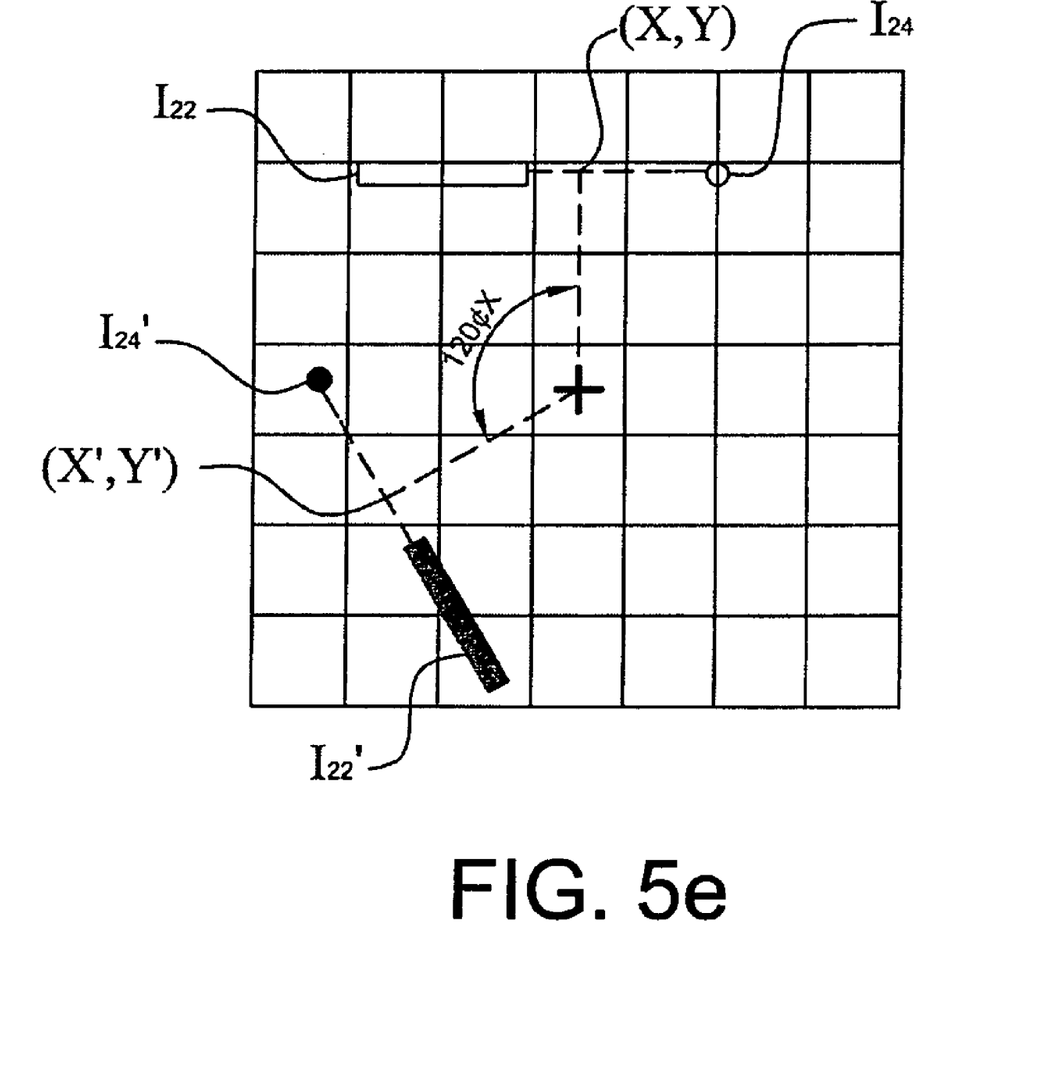
FIG. 5e shows a schematic view of an image sensed by the image sensor according to the embodiment of the present invention, wherein the image sensor captures the image under 120 degrees clockwise rotation.

Referring to FIGS. 5*a* to 5*e*, they respectively show the digital images formed under different rotation angles according to the quasi analog knob control method of the present invention. As shown in FIG. 5*a*, it shows a digital image captured by the remote controller 30 without rotation, wherein positions of the images $I_{22}'$ and $I_{24}'$ are identical to that of the images $I_{22}$ and $I_{24}$ in step 400, and the knob icon 14 and the function status can be defined as unchanged in this moment. As shown in FIG. 5*b*, it shows a digital image captured by the remote controller 30 under thirty degrees clockwise rotation, wherein the angle difference between the images $I_{22}'$, $I_{24}'$ and the images $I_{22}$, $I_{24}$ are shown by the first method aforementioned, and the knob icon 14 and the function status can be defined as 20% increasing or decreasing. As shown in FIG. 5*c*, it shows a digital image captured by the remote controller 30 under sixty degrees clockwise rotation, wherein the knob icon 14 and the function status can be defined as 40% increasing or decreasing. As shown in FIG. 5*d*, it shows a digital image captured by the remote controller 30 under ninety degrees clockwise rotation, wherein the knob icon 14 and the function status can be defined as 60% increasing or decreasing. As shown in FIG. 5*e*, it shows a digital image captured by the remote controller 30 under 120 degrees clockwise rotation, wherein the knob icon 14 and the function status can be defined as 80% increasing or decreasing. It should be noted that, all degrees and percentages disclosed herein are only exemplary embodiments and they are not used to limit the present invention. The degrees and percentages are determined by the requirements of different products. In addition, although the rotation of the remote controller 30 is only illustrated by the clockwise direction, the implementation of the counterclockwise rotation is similar to that of the clockwise rotation and therefore the details will not be illustrated herein.

As described above, in the conventional remote control method, it is necessary to repeatedly press control buttons so as to continuously alter a function status of a display device; therefore, it has the problems of inconvenient operation and short lifetime of the remote controller. By using the quasi analog knob control method and apparatus according to the present invention (as shown in FIGS. 1*a*, 1*b* and 3), the above problems can be solved, and because a user is able to control the display device only by rotating the remote controller to, the operation is significantly humanized. Furthermore, since the operation can be performed without using many buttons, the operational procedures can also be simplified.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A quasi analog knob control method of controlling a function status of a display device by imitating the rotation of an analog knob, the control method comprising the steps of: providing at least two reference points for generating light of a predetermined spectrum and defining a predetermined area surrounding the reference points; providing an image sensor to point inside the predetermined area; receiving the light of the predetermined spectrum by the image sensor to form a digital image; identifying image positions of the reference points on the digital image and obtaining a first parameter; rotating the image sensor for imitating the rotation of the analog knob and obtaining a second parameter; and calculating a rotation angle difference between the first and the second parameters and calculating a step by dividing the rotation angle difference by a step parameter, which is an identifiable angle of the rotating of the image sensor for defining a varying sensitivity, so as to control the function status of the display device according to the calculated step.

2. The control method as claimed in claim 1, further comprising:
providing an optical filter disposed in front of the image sensor to filter the light with a band outside the predetermined spectrum.

3. The control method as claimed in claim 1, wherein the predetermined area is determined by both the emitting angles of the reference points and the viewing angle of the image sensor.

4. The control method as claimed in claim 1, further comprising:
providing a processing unit for storing the digital image, the first and the second parameters and for calculating the rotation angle difference between the first and the second parameters.

5. The control method as claimed in claim 4, wherein the processing unit is electrically or wirelessly connected to the display device for signal transmission so as to control the function status of the display device accordingly.

6. The control method as claimed in claim 1, wherein the function status is selected from the group consisting of a volume status, a brightness status, a contrast status, a screen position status, and a screen size status.

7. The control method as claimed in claim 1, wherein the first parameter comprises coordinates and an average coordinate of the images of the reference points on a plane space formed by the sensing array of the image sensor before the image sensor is rotated while the second parameter comprises coordinates and an average coordinate of the images of the reference points on the plane space formed by the sensing array of the image sensor after the image sensor is rotated.

8. The control method as claimed in claim 7, wherein in the step of calculating a rotation angle difference between the first and the second parameters, the rotation angle difference is an angle difference between a connection line of the average coordinate in the second parameter and the center of the sensing array and a connection line of the average coordinate in the first parameter and the center of the sensing array.

9. The control method as claimed in claim 7, wherein in the step of calculating a rotation angle difference between the first and the second parameters, the rotation angle difference is an angle difference between a connection line of the coordinates of the images of the reference points in the second parameter and a connection line of the coordinates of the images of the reference points in the first parameter.

10. The control method as claimed in claim 1, wherein the step parameter is two degrees.

11. The control method as claimed in claim 10, wherein an identifiable range of the rotation angle difference is between 358 degrees clockwise and 358 degrees counterclockwise.

12. The control method as claimed in claim 1, wherein the display device is selected from the group consisting of a computer screen, a game machine screen and a television.

13. The control method as claimed in claim 12, wherein the image sensor is integrated in a remote controller.

14. The control method as claimed in claim 13, further comprising:
providing a processing unit disposed inside the remote controller for storing the digital image, the first and the second parameters and for calculating the rotation angle difference between the first and the second parameters.

15. The control method as claimed in claim 1, wherein the reference points are independent devices or integrated in the display device.

16. The control method as claimed in claim 1, further comprising:
providing a knob icon shown on the display device to act corresponding to the rotation of the image sensor.

17. A quasi analog knob control apparatus for controlling a function status of a display device by imitating the rotation of an analog knob, the control apparatus comprising:
at least two reference points configured to generate light of a predetermined spectrum and defining a predetermined area;
an image sensor configured to point inside the predetermined area and to receive the light of the predetermined spectrum to form a digital image; and
a processing unit configured to receive the digital image and to identify image positions of the reference points on the digital image;
wherein the rotation of the analog knob is imitated by rotating the image sensor during capturing images and a rotation angle of the image sensor is calculated according to the image positions of the reference points on the digital image identified by the processing unit whereby controlling the function status of the display device according to a step calculated by dividing the rotation angle by a step parameter which is an identifiable angle of the rotating of the image sensor for defining a varying sensitivity.

18. The control apparatus as claimed in claim 17, wherein the predetermined spectrum is infrared spectrum and the image sensor is an infrared image sensor.

19. The control apparatus as claimed in claim 17, wherein the reference points are emitting light sources configured to emit the light of the predetermined spectrum.

20. The control apparatus as claimed in claim 19, wherein the reference points are infrared light emitting diodes.

21. The control apparatus as claimed in claim 17, wherein the reference points are non-emitting light sources configured to reflect the light of the predetermined spectrum.

22. The control apparatus as claimed in claim 21, further comprising a light source configured to generate the light of the predetermined spectrum.

23. The control apparatus as claimed in claim 17, further comprising an optical filter disposed in front of the image sensor to filter the light with a band outside the predetermined spectrum.

24. The control apparatus as claimed in claim 23, wherein the image sensor is a CMOS image sensor or a CCD image sensor.

25. The control apparatus as claimed in claim 17, wherein the image sensor has a wide-angle camera lens.

26. The control apparatus as claimed in claim 17, the two reference points having a strip shape and a dot shape respectively, having different areas or having identical shapes.

27. The control apparatus as claimed in claim 17, wherein the reference points are independent devices or integrated in the display device.

28. The control apparatus as claimed in claim 17, wherein the display device is selected from the group consisting of a computer screen, a game machine screen or a television.

29. The control apparatus as claimed in claim 17, wherein the image sensor and the processing unit are integrated in a remote controller.

30. The control apparatus as claimed in claim 29, wherein the remote controller is electrically or wirelessly connected to the display device for signal transmission.

31. The control apparatus as claimed in claim 17, wherein the function status is selected from the group consisting of a volume status, a brightness status, a contrast status, a screen position status, and a screen size status.

32. A screen remote control apparatus, comprising:
a screen whose function status is controlled by imitating a rotation of an analog knob;
at least two reference points configured to generate light of a predetermined spectrum and defining a predetermined area; and
a remote controller, comprising:
an image sensor configured to point inside the predetermined area and to receive the light of the predetermined spectrum to form a digital image; and
a processing unit configured to receive the digital image and to identify image positions of the reference points on the digital image;
wherein the rotation of the analog knob is imitated by rotating the remote controller and a rotation angle of the remote controller is calculated according to the image positions of the reference points on the digital image identified by the processing unit whereby controlling the function status of the screen according to a step calculated by dividing the rotation angle by a step parameter which is an identifiable angle of the rotating of the remote controller for defining a varying sensitivity.

33. The screen remote control apparatus as claimed in claim 32, wherein the remote controller further comprises a wireless transmission unit electrically connected to the processing unit for transmitting a control signal to the screen so as to accordingly control the function status thereof.

34. The screen remote control apparatus as claimed in claim 32, wherein the remote controller further comprises an optical filter disposed in front of the image sensor and configured to filter the light with a band outside the predetermined spectrum.

35. The screen remote control apparatus as claimed in claim 32, wherein the reference points are independent devices or integrated in the screen.

36. The screen remote control apparatus as claimed in claim 32, wherein the reference points are non-emitting light sources configured to reflect the light of the predetermined spectrum and the remote controller further comprises a light source for generating the light of the predetermined spectrum.

37. The screen remote control apparatus as claimed in claim 32, comprising four reference points, wherein three of the reference points are identical dot shapes while the fourth reference point is of a strip shape.

38. The screen remote control apparatus as claimed in claim 32, the two reference points having a strip shape and a dot shape respectively, having different areas or having identical shapes.

39. The screen remote control apparatus as claimed in claim 32, wherein the predetermined spectrum is infrared spectrum.

40. The screen remote control apparatus as claimed in claim 32, wherein the function status is selected from the group consisting of a volume status, a brightness status, a contrast status, a screen position status, or a screen size status.

41. The screen remote control apparatus as claimed in claim 32, wherein a knob icon is shown on the screen and acts corresponding to the rotation of the remote controller.

* * * * *